(12) United States Patent
Shaniuk (10) Patent No.: US 6,849,187 B2
(45) Date of Patent: Feb. 1, 2005

(54) ARSENIC REMOVAL MEDIA

(75) Inventor: Thomas J. Shaniuk, Strongsville, OH (US)

(73) Assignee: Engelhard Corporation, Iselin, NJ (US)

( * ) Notice: Subject to any disclaimer, the term of this patent is extended or adjusted under 35 U.S.C. 154(b) by 84 days.

(21) Appl. No.: 10/315,960

(22) Filed: Dec. 10, 2002

(65) Prior Publication Data

US 2004/0108275 A1 Jun. 10, 2004

(51) Int. Cl.$^7$ ................................................. C02F 1/28
(52) U.S. Cl. ..................................... 210/688; 423/633
(58) Field of Search ............................... 210/681, 684, 210/688; 423/633

(56) References Cited

U.S. PATENT DOCUMENTS

| | | | | |
|---|---|---|---|---|
| 4,515,756 | A | * 5/1985 | Blumer | ......................... 423/54 |
| 5,053,139 | A | 10/1991 | Dodwell et al. | ............ 210/688 |
| 5,071,587 | A | 12/1991 | Perman | ....................... 252/181 |
| 5,254,516 | A | 10/1993 | Gupta et al. | ................... 502/84 |
| 5,296,438 | A | 3/1994 | Heung | ......................... 502/407 |
| 5,569,445 | A | * 10/1996 | Fukatsu et al. | ............. 423/633 |
| 5,603,838 | A | 2/1997 | Misra et al. | ................. 210/665 |
| 6,030,537 | A | 2/2000 | Shaniuk et al. | ............. 210/683 |
| 6,342,191 | B1 | 1/2002 | Kepner et al. | .............. 423/210 |
| 2002/0074292 | A1 | 6/2002 | Schlegel et al. | ............ 210/681 |

FOREIGN PATENT DOCUMENTS

| | | |
|---|---|---|
| WO | WO 83/03595 | 10/1983 |
| WO | 9637438 | 11/1996 |
| WO | 9950182 | 10/1999 |
| WO | 0154786 | 8/2001 |
| WO | 0226630 | 4/2002 |
| WO | 0226631 | 4/2002 |
| WO | 0226632 | 4/2002 |
| WO | 0226633 | 4/2002 |
| WO | WO 02/47811 A1 | 6/2002 |

OTHER PUBLICATIONS

Gupta, et al.; "Arsenic Removal by Adsorption"; Mar. 1978; pp. 493–506.
Anderson, et al.; "Arsenate Adsorption on Amorphous Aluminum Hydroxide"; Journal of Colloid and Interface Science, vol. 54, No. 3, Mar. 1976; pp. 391–399.
Gulledge, et al.; "Removal of Arsenic (V) From Water by Adsorption on Aluminum and Ferric Hydroxides"; Journal Water Technology/Quality J–AWWA; Aug. 1973; pp. 548–552.
Raven Klaus P et al: "Arsenite and Arsenate Adsorption on Ferrihydrite: Kinetics, Equilibrium, and Adsorption Envelopes". Environmental Science and Technology, vol. 32, No. 3, Feb. 1, 1998, pp. 344–349, XP002276906 ISSN: 0013–936X—p. 344–p. 345, left–hand column.

* cited by examiner

*Primary Examiner*—Robert A. Hopkins
(74) *Attorney, Agent, or Firm*—Russell G Lindenfeldar (57) ABSTRACT

Disclosed is a heavy metal removal media containing ferric hydroxide having unique levels of microporosity and mesoporosity/macroporosity, and/or a specific average particle size and/or granule size. The ferric hydroxide is made by simultaneously combining in a vessel at least one iron salt and at least one hydroxide compound, and then recovering the ferric hydroxide. The ferric hydroxide made by simultaneous mixing is effective in removing heavy metals, such as arsenic, from aqueous systems.

22 Claims, 4 Drawing Sheets

ARSENIC REMOVAL MEDIA

FIELD OF THE INVENTION

The present invention generally relates to media that can remove heavy metals from aqueous systems. In particular, the present invention relates to a unique form of ferric hydroxide that effectively removes heavy metals such as arsenic from water.

BACKGROUND OF THE INVENTION

Even low levels of heavy metals (for example arsenic, lead, cadmium, mercury, etc.) in drinking water are considered detrimental to a person's health, and in the case of infants, are believed to impede intellectual development. Recognizing these hazards, the Environmental Protection Agency (EPA) has established limits on the presence of heavy metals in drinking water. For example, no more than 15 parts per billion (15 ppb) of lead may be present in public water systems. The EPA and the World Health Organization (WHO) have established that a safe threshold for arsenic levels in drinking water is less than 10 micrograms per liter (ppb) of arsenic. In addition, industrial water streams must contain less than 0.5 ppm of heavy metals before the water can be discharged.

In addition to reducing the heavy metals to acceptable EPA levels, it is desirable to improve the taste, odor and smell of drinking water by removing chlorine, ionic metals, organic molecules and colloidal particles. Ion exchangers, both organic and inorganic, including crystalline molecular sieve zeolites, are known to remove certain metals from aqueous systems such as drinking water. Activated carbon is also used in water purification or remediation processes. Activated carbon improves taste, odor and smell by adsorbing ionic metals, organic molecules and colloidal particles and also removes chlorine.

The purification of drinking water is often accomplished at its point of use, such as under-the-counter, on-the-counter, whole house systems, under-the-tap, or free standing gravity flow carafe type devices. For industrial/commercial applications, packed bed systems are typically used.

Activated alumina is known to have some capacity for the adsorption of arsenic from water. One of the drawbacks associated with alumina is that the arsenic removal capacity is relatively low and large amounts of media are needed to provide sufficient life for the adsorption column.

A material comprising lanthanum oxides and alumina can be used for arsenic removal, but lanthanum oxides are too expensive for the treatment of large volumes of water. Recently, another media containing aluminum oxide and manganese oxide, sold under the trade designation AQUA-BIND, removes higher levels of arsenic over standard activated alumina.

There is an ongoing effort to develop improved products which meet or exceed EPA requirements for heavy metals removal as well as improved taste, color and odor, and have flow rates which are commercially acceptable.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

One aspect of the invention relates to heavy metal removal media containing ferric hydroxide having unique levels of microporosity, mesoporosity, and/or macroporosity, and a specific average particle size and/or granule size. Another aspect of the invention relates to making the ferric hydroxide. Unlike conventionally made ferric hydroxide, the ferric hydroxide of the present invention is made by simultaneously combining in a vessel at least one iron salt and at least one hydroxide compound, and then recovering the ferric hydroxide. Yet another aspect of the invention relates to using the ferric hydroxide made by simultaneous mixing to remove heavy metals, such as arsenic, from aqueous systems.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention relates to media suitable for use in the removal of heavy metals such as lead, cadmium, zinc, copper, chromium, arsenic, and mercury from aqueous systems containing one or more of the metals. The media is particularly effective at removing arsenic from aqueous systems. For purposes of this invention, the term heavy metals includes heavy metal ions (for example As (III), As (V), and the like), heavy metals, and compounds containing at least one heavy metal atom (for example, sodium arsenate).

The aqueous systems to which the method of the instant invention is typically applied are industrial, municipal, remote, or residential water streams. For example, the media can be employed in the treatment of drinking water, in an industrial, municipal, residential, or remote (portable) context to decrease the amount of heavy metals in the water.

The media contains ferric hydroxide having specific particle size and/or levels of microporosity, mesoporosity, and/or macroporosity, which contribute to its ability to remove unwanted ions and unwanted compounds from aqueous systems. The ferric hydroxide used in the media is formed in a manner that maximizes the ability of the media to remove unwanted ions and compounds from aqueous systems. The ferric hydroxide of the present invention has a higher capacity for unwanted ions and unwanted compounds per unit weight than conventionally made ferric hydroxide, alumina, magnesia, bauxite, and zeolites (natural and synthetic). Consequently, smaller aqueous system treatment systems can be made, and/or aqueous system treatment systems that require fewer changeouts (replacement/recharging of unsaturated media). Since the ferric hydroxide of the present invention can be heated/dried without significantly decreasing the removal capacity of the ferric hydroxide (heating/drying conventional ferric hydroxide decreases arsenic removal capacity), a dry form of ferric hydroxide media can be easily transported and stored.

The ferric hydroxide of the present invention is made by combining an iron salt with a hydroxide compound in a new container. In this sense, new container means a container without any iron salts or hydroxide compounds therein. The new container may contain water or other reactive medium therein, but no reactants. That is, the reaction between the iron salts and hydroxide compounds occurs in a new vessel, with both compounds added thereto. Adding simultaneously the iron salt from one source or container and the hydroxide compound from another source or container to the new container to form ferric hydroxide in the new container is a notable aspect of the invention. Conventional ferric hydroxide is made by adding a ferric salt solution to an alkali metal hydroxide solution, or adding the alkali metal hydroxide solution to the ferric salt solution (sequential addition). The present invention does not involve either sequential process.

Conventional ferric hydroxide made by sequential addition generally results in an undesirably large amount of fines and small particles. These undesirably large amount of fines and small particles present difficulties in the maintenance and operation of well-site and municipal water treatment systems. Also, conventional ferric hydroxide made by sequential addition typically contains undesirably high levels of moisture (such as from 25 to 50%) since drying decreases the arsenic removal capacity.

In most instances, the iron salt and the hydroxide compound are in aqueous solutions when combined. However, one of the iron salt and the hydroxide compound may be in an aqueous solution and the other in dry form when combined. Alternatively, both the iron salt and the hydroxide compound may be in dry form while water is also added to the new container.

Iron salts include ferric salts and ferrous salts. Specific examples of iron salts include ferric chloride, ferric fluoride, ferric bromide, ferric nitrate, ferric sulfate, ferric phosphate, ferric carbonate, ferric bicarbonate, ferrous chloride, ferrous bromide, ferrous iodide, ferrous acetate, ferrous bicarbonate, ferrous bicarbonate, ferrous sulfate, hydrates thereof, mixtures of two or more thereof, and the like.

In embodiments where an aqueous solution of an iron salt is combined with the hydroxide compound, the concentration of the iron salt is sufficient to facilitate formation of ferric hydroxide. In one embodiment, the aqueous solution contains from about 1% to about 40% by weight of at least one ferric salt. In another embodiment, the aqueous solution contains from about 3% to about 30% by weight of at least one ferric salt. In yet another embodiment, the aqueous solution contains from about 10% to about 25% by weight of at least one ferric salt.

In one embodiment, the aqueous solution of the iron salt is an acidic solution (pH below 7). In another embodiment, the acidic aqueous solution of the iron salt has a pH below about 5. In yet another embodiment, the acidic aqueous solution of the iron salt has a pH below about 4.

General examples of hydroxide compounds include ammonium hydroxides, alkali metal hydroxides, and alkaline earth metal hydroxides. Specific examples of hydroxide compounds include ammonia hydroxide, alkyl ammonium hydroxide, tetra-alkylammonium hydroxides, sodium hydroxide, potassium hydroxide, calcium hydroxide, magnesium hydroxide, mixtures of two or more thereof, and the like.

In embodiments where an aqueous solution of a hydroxide compound is combined with the iron salt, the concentration of the hydroxide compound is sufficient to facilitate formation of ferric hydroxide. In one embodiment, the aqueous solution contains from about 1% to about 40% by weight of at least one hydroxide compound. In another embodiment, the aqueous solution contains from about 3% to about 30% by weight of at least one hydroxide compound. In yet another embodiment, the aqueous solution contains from about 10% to about 25% by weight of at least one hydroxide compound.

The aqueous solution of the hydroxide compound is a basic solution (pH above 7). In another embodiment, the aqueous solution of the hydroxide compound has a pH above about 9. In yet another embodiment, the aqueous solution of the hydroxide compound has a pH above about 10.

Once combined, the combination solution containing the hydroxide compound and iron salt is mixed to facilitate formation of a ferric hydroxide precipitate. In order to facilitate formation of the ferric hydroxide precipitate, the pH is maintained in the weakly acidic to moderately basic range. The solution turns into a slurry as the solid ferric hydroxide is formed. In one embodiment, the combination solution is maintained at a pH from about 5 to about 10 to facilitate formation of the ferric hydroxide precipitate. In another embodiment, the combination solution is maintained at a pH from about 6 to about 9. In yet another embodiment, the combination solution is maintained at a pH from about 6.5 to about 8.5.

Optionally, after or while combining the hydroxide compound and the iron salt, gas is sparged into the slurry to facilitate the formation of the ferric hydroxide precipitate. Gases that may be introduced into the slurry include air and inert gases such as nitrogen, helium, neon, argon, xenon, and the like.

After the ferric hydroxide precipitate is formed, the combination solution or slurry is filtered in any suitable manner to recover the solid ferric hydroxide. For example, the ferric hydroxide slurry may be filtered in a filter press, centrifuge, drum filter, or any other filtration process. Also present in the ferric hydroxide slurry is a water soluble salt, formed by the anion of the iron salt and the cation of the hydroxide compound. This water soluble salt is removed with the water from the slurry leaving the ferric hydroxide precipitate. The recovered ferric hydroxide precipitate may be optionally washed with water to remove any undesirable residual salts (such as NaCl, KCl, $NH_4Cl$, and the like).

This simultaneous precipitation results in a smaller particle size of the ferric hydroxide solid that is formed in the slurry as compared to the sequential precipitation techniques that are conventionally employed. Particle size of the precipitates is measured by Malvern Laser analysis. In one embodiment, 10% by volume of the ferric hydroxide solid prepared by the present invention have a particle size from about 0.1 to about 1.2 microns, 50% by volume have a particle size from about 1.5 to about 6.5 microns, and 90% by volume have a particle size from about 7.5 to about 20 microns. In another embodiment, 10% by volume of the ferric hydroxide solid prepared by the present invention have a particle size from about 0.2 to about 0.75 microns, 50% by volume have a particle size from about 2 to about 6 microns, and 90% by volume have a particle size from about 9 to about 17.5 microns.

The ferric hydroxide is separated from the slurry and dried. The filtered ferric hydroxide can be allowed to dry without introducing heat, then milled and screened to produce granules or powder. Alternately, the filtered ferric hydroxide can be milled and screened in a wet state or dry state to produce granules or powder. Pressure compaction processes including extrusion can also be used to produce formed particles.

Once collected, the ferric hydroxide is optionally dried. Drying may involve at least one of heating, storing under vacuum, spray drying, spin flash drying, and dessication. Heating involves exposing the ferric hydroxide to elevated temperatures to induce the release of water. In one embodiment, the ferric hydroxide is exposed to temperatures from about 30° C. to about 150° C. In another embodiment, the ferric hydroxide is exposed to temperatures from about 50° C. to about 100° C. In yet another embodiment, the ferric hydroxide is exposed to temperatures from about 70° C. to about 90° C. Advantageously, heating does not significantly decrease the removal capacity of the ferric hydroxide. After or in conjunction with heating/drying, the ferric hydroxide may be subjected to crushing such as using an impact mill.

The dried ferric hydroxide contains low levels of moisture/water, which contributes to its ability to adsorb large amounts of heavy metals. In one embodiment, the ferric hydroxide made in accordance with the present invention contains less than about 20% by weight moisture. In another embodiment, the ferric hydroxide made in accordance with the present invention contains less than about 15% by weight moisture. In yet another embodiment, the ferric hydroxide made in accordance with the present invention contains less than about 5% by weight moisture. In still yet another embodiment, the ferric hydroxide made in accordance with the present invention contains less than about 1% by weight moisture.

The filtered ferric hydroxide recovered from the filter press, centrifuge, drum filter, or other filtration process can also be formed directly into granules, or other formed particles, through pressure compaction processes such as roll presses, briquettors, extruders, pan or disk agglomerators, and the like. Standard binders and lubricants may be used in the forming process, if necessary, to impart additional physical strength to the formed particle or provide for smoother operation of the forming process. In these embodiments, the formed particle or media comprises from about 0.01% to about 35% by weight of one or more binders and/or lubricants. In another embodiment, the media comprises from about 0.1% to about 20% by weight of one or more binders and/or lubricants.

Examples of binders include materials such as alginates, dextrin, glucose, gums, starch, waxes, glues; polymer compounds such as polyvinyl acetate, polyolefins such as polyethylene and polyprophylene, and polyvinyl alcohol; mineral acids such as sulfuric acid and phosphoric acid; phosphates such as ammonium phosphate; silica compounds such as alkaline silicates and silica hydrosol; aluminas; silica-aluminas; and colloidal clays.

The media can consist essentially of the ferric hydroxide produced in accordance with the invention (simultaneous addition). However, the media containing the ferric hydroxide may optionally further contain other adsorptive material, such as one or more of conventionally made ferric hydroxide (sequential ferric hydroxide), activated carbon, alumina, magnesia, bauxite, zeolites, and the like. In one embodiment, the removal media contains from about 10% to 100% by weight of the ferric hydroxide produced in accordance with the invention and from 0% to about 95% of at least one of conventionally made ferric hydroxide, activated carbon, alumina, magnesia, bauxite, and zeolites. In another embodiment, the removal media contains from about 25% to about 95% by weight of the ferric hydroxide produced in accordance with the invention and from about 5% to about 75% of at least one of conventionally made ferric hydroxide, activated carbon, alumina, magnesia, bauxite, and zeolites.

The media is employed to remove unwanted compounds including heavy metals from water. The media is employed in powder or granule form. A granule is an agglomerate of many small particles. The particular processing after forming the ferric hydroxide slurry controls whether the ferric hydroxide is in powder or granule form. For example, spray drying or extensive crushing techniques typically lead to the formation of ferric hydroxide powders while filtration, heat drying, and/or moderate crushing typically lead to the formation of ferric hydroxide granules.

The media when in powder form contains ferric hydroxide having a certain particle size that contributes to its ability to remove unwanted ions and unwanted compounds from aqueous systems. In one embodiment, when the media is employed in powder form, the average particle size by weight is from about 5 microns to about 175 microns. In another embodiment, embodiment, when the media is employed in powder form, the average particle size by weight is from about 10 microns to about 160 microns. In yet another embodiment, embodiment, when the media is employed in powder form, the average particle size by weight is from about 20 microns to about 150 microns.

The media when in granule form contains ferric hydroxide having a certain particle size that contributes to its ability to remove unwanted ions and unwanted compounds from aqueous systems. In one embodiment, when the media is employed in granule form, the average particle size by weight is from about 4 mesh to about 400 mesh. In another embodiment, when the media is employed in granule form, the average particle size by weight is from about 20 mesh to about 300 mesh. In yet another embodiment, when the media is employed in granule form, the average particle size by weight is from about 30 mesh to about 200 mesh.

The media, whether in powder form or granule form, contains ferric hydroxide having levels of microporosity, mesoporosity, and/or macroporosity which contribute to its ability to remove unwanted ions and unwanted compounds from aqueous systems. In particular, the ferric hydroxide has a relatively high percentage (a major amount) of its pores as mesoporous and relatively low percentages (minor amounts) of its pores as microporous and macroporous. In one embodiment, the levels of porosity in the ferric hydroxide are less than 50% microporosity, from 50% to about 100% mesoporosity and/or macroporosity. In another embodiment, the levels of porosity in the ferric hydroxide are less than about 40% microporosity, from about 60% to about 99% mesoporosity and/or macroporosity. In yet another embodiment, the levels of porosity in the ferric hydroxide are less than about 35% microporosity, from about 65% to about 95% mesoporosity and/or macroporosity. The relatively high levels of mesoporosity and/or macroporosity improve the adsorptive characteristics of the media.

In one embodiment, in the mesoporosity and/or macroporosity fraction, the levels of porosity are from about 0% to about 100% mesoporosity and from about 0% to about 100% macroporosity. In another embodiment, in the mesoporosity and/or macroporosity fraction, the level of mesoporosity is greater than the level of macroporosity. In yet another embodiment, in the mesoporosity and/or macroporosity fraction, the levels of porosity are from about 60% to about 99% mesoporosity and from about 1% to about 40% macroporosity.

Microporosity refers to pores having a size (average cross-section) of less than 2 nm, mesoporosity refers to pores having a size from 2 nm to 50 nm, while macroporosity refers to pores having a size greater than 50 nm. A major amount refers to 50% or more while a minor amount refers to less than 50%.

The heavy metal removal media of the present invention may be packed into a fixed-bed adsorbent column or container. The heavy metal containing aqueous system or stream is charged or pumped into the adsorbent bed system in either up-flow or down-flow fashion. Treated water with significantly reduced levels of heavy metals flows out of the system. There is a significant advantage from a system operation and maintenance standpoint to be able to load dry media, as opposed to moist or wet media, into these columns or containers. The present invention provides for a high level of heavy metal removal capacity along with easier and smoother operation of water treatment systems.

The media may be formed into a multi-component block cartridge filter or formed into a singular-active component block cartridge filter. The media can also be used as is in water treatment or clarification systems and in pre-coat filter/adsorption systems.

In some instances, heavy metal removal from aqueous streams can be complicated by the presence of other contaminants such as competing ions. Such competing ions include alkaline earth metal ions, often present as calcium or magnesium sulfates and phosphates, and halide ions such as chlorides or fluorides. The presence of these competing ions in aqueous systems can vary greatly. In one embodiment, an aqueous system that is contacted with the media of the present invention contains from about 10 ppm to about 1,000 ppm of competing ions. In another embodiment, an aqueous system that is contacted with the media of the present invention contains from about 25 ppm to about 800 ppm. In yet another embodiment, an aqueous system that is contacted with the media of the present invention contains from about 50 ppm to about 300 ppm. In yet another embodiment, an aqueous system that is contacted with the media of the present invention contains from about 75 ppm to about 200 ppm.

The presence of these competing ions can make heavy metal removal from aqueous systems much more difficult. This is because the competing ions present compete for available adsorption sites on the media and consequently lower the heavy metal removal efficiency of the media. In drinking water treatment, the most common competing cations are calcium, magnesium, iron from rusty pipes, and copper from plumbing, and most common competing anions are sulphate, phosphate, chloride and fluoride ions. In the present invention, the presence of competing ions does not materially effect the removal characteristics of the media.

The heavy metal removal media can be recovered by collecting the filtered ferrous hydroxide, or by mixing the recovered ferric hydroxide and optional components in the presence of water so as to form granules. The ferric hydroxide powders can also be formed into $1/32$" to $1/8$" diameter extrudates or pressed into tablets. The formed heavy metal removal media can be dried. Drying formed granules or tablets can be performed from 50° C. to 150° C. in order to impart sufficient "green strength" so that the formed media can be handled and transported. The dried media may be screened to a desired mesh size.

In one embodiment, a 2.5"×9.5" cartridge loaded with the media removes at least about 75% of the heavy metals in 1500 gallons of an aqueous system passed therethrough. In another embodiment, a 2.5"×9.5" cartridge loaded with the media removes at least about 90% of the heavy metals in 1500 gallons of an aqueous system passed therethrough.

In order to meet the proposed EPA standard and the current WHO standard, arsenic concentrations in the effluent should be less than 10 ppb (micrograms/liter). As may be seen from the data set forth, the arsenic removal media of the present invention has the capability of reducing arsenic concentration in aqueous systems to the proposed EPA levels, while maintaining commercially attractive adsorption capacities and performance.

In one embodiment, aqueous systems passed through the media have an arsenic content of about 10 ppb or less for about 1,000 gallons or more at a pH of 8.5 in accordance with the NSF International Standard 53 Protocol for Pentavalent arsenic reduction. In another embodiment, aqueous systems passed through the media have an arsenic content of about 10 ppb or less for about 1,500 gallons or more at a pH of 8.5 in accordance with the NSF International Standard 53 Protocol. In yet another embodiment, aqueous systems passed through the media have an arsenic content of about 10 ppb or less for about 2,000 gallons or more at a pH of 8.5 in accordance with the NSF International Standard 53 Protocol.

NSF International Standard 53 Protocol for Pentavalent arsenic reduction calls for preparing a tank of test water, in this case a tank of 500 gallons is prepared, by mixing in and dissolving various chemicals to produce a concentration of 0.050 mg/L arsenic pentavalent at pH 8.5 with competing ions at levels typically found in groundwaters. A cylindrical "water filter" with dimensions of 2.5" diameter and 9.5" high is vibrationally packed with adsorbent media granules and sealed with a screw-top lid to provide for a uniform adsorbent fixed bed. The "water filter" is loaded into plastic housings and plumbed into the 500 gallon tank and pump system using flexible plastic tubing. Positive displacement water pumps are used to provide a 60–65 psi pressure head to the filters, the test waters are then pumped through the adsorbent media, and the water effluent is sampled and analyzed for arsenic levels using a Perkin-Elmer 5100ZL Graphite Furnace Atomic Adsorption Spectrometer. The water pumps are hooked into an electronic timer and operated on a 50%-on/50%-off cycle basis with a 15 minute cycle, 16 hours per day followed by an 8 hour rest under pressure as outlined in the Standard 53 Protocol. The NSF Protocol calls for testing at both pH 6.5 and pH 8.5, however, the chemistry of arsenic is such that it is much more difficult to remove arsenic from water at pH 8.5. If a media shows a certain performance level for removing arsenic at pH 8.5, then it always shows a higher arsenic removal performance at pH 6.5. Therefore, all of the media testing for the purposes herein are run at pH 8.5.

The heavy metal removal media can be packed into a fixed-bed column or container. The heavy metal containing aqueous stream moves through the heavy metal removal media. Treated water with significantly reduced levels of heavy metals flows out of the column or container. For example arsenic and/or lead concentrations in the effluent are typically less than about 15 ppb (micrograms/liter), and often the effluent concentrations can be as low as about 2 ppb of heavy metal. The capacity of the heavy metal removal media is higher with higher levels of heavy metal permitted in the effluent stream. In residential or remote applications, the heavy metal removal media can be used as a free-flowing granular media, filled into a cartridge with holes on the top to permit entry of the contaminant solution, which is allowed to trickle through the bed of the composite material and then exit through holes on the bottom of the cartridge, possibly into a reservoir to hold the treated water.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

15 lbs of water is added to a 35 gallon holding tank equipped with a mixer. 71 lbs of 40% ferric chloride solution is loaded into a separate 15 gallon tank. 15 lbs of water and 40 lbs of 50% sodium hydroxide are loaded into another separate 15 gallon tank. The ferric chloride solution and the diluted sodium hydroxide solutions are pumped simultaneously into the 35 gallon holding tank while mixing. The pH of the resultant slurry is maintained from 6.6 to 7.2 throughout the entire precipitation reaction. After all of the solutions are pumped into the reactor tank, the pH is adjusted to 7.0. The reactor slurry is pumped into a plate and frame filter press and then washed with 1100 gallons of water until the exit water has a conductivity of 80 micromhoes greater than the incoming water. The filter cake is unloaded from the press and allowed to dry at room temperature (about 25° C.) in plastic trays. The dried filter cake is then milled in a Como-Mill and hand screened −30 and +60 mesh to produce 30×60 mesh ferric hydroxide granules.

EXAMPLE 2

40 lbs of water is added to a 35 gallon holding tank equipped with a mixer. 75 lbs of water and 71 lbs of 40% ferric chloride are loaded into a separate 15 gallon tank. 95 lbs of water and 40 lbs of 50% sodium hydroxide are loaded into another separate 15 gallon tank. The diluted ferric chloride solution and the diluted sodium hydroxide solutions are pumped simultaneously into the 35 gallon holding tank while mixing. The pH of the resultant slurry is maintained from 6.5 to 8.0 during the precipitation reaction. After all of the solutions are pumped into the reactor tank, the pH is adjusted to 7.1. The reactor slurry is pumped into a plate and frame filter press and then washed with 2500 gallons of water until the exit water has a conductivity of 600 micromhoes greater than the incoming water. The filter cake is unloaded from the press and dried @ 80C. for 24 hours. The dried filter cake is then milled in a Como-Mill and hand screened −30 and +80 to produce 30×80 mesh ferric hydroxide granules.

EXAMPLE 3

The wet filter cake (before drying) from Example 2 is dried without heat at room temperature (about 25° C.) for 16 hours. The dried filter cake is then milled in a Como-Mill and hand screened −30 and +80 to produce 30×80 mesh ferric hydroxide granules.

All of these examples of the present invention, Aqua-Bind media, AAFS50 (iron on alumina media), H-10 hydrate activated alumina, GEH granular ferric hydroxide (commercially available conventionally made ferric hydroxide), and ferric hydroxide material prepared via the prior art (with and without heating after ferric hydroxide recovery) are tested for arsenic reduction performance utilizing the NSF International Standard 53 Protocol for Pentavalent arsenic reduction. The media samples to be tested are vibrationally packed into hollow cylindrical columns or "water filters" having about 2.5" diameter × about 9.5" height. The "water filters" are then loaded into plastic housings, plumbed into a 500 gallon tank testing system, and evaluated for arsenic removal at a constant pH of 8.5 which represents the most difficult conditions for the reduction of arsenic in aqueous streams.

The challenge waters used for testing represent typical characteristics of arsenic contaminated water and as such contain 0.050 mg/L arsenic pentavalent and other competing ions including $Mg^{2+}$, $SO_4^{2-}$, $NO_3^-$, $F^-$, $SiO_2$, $PO_4^{--}$, and $Ca^{2+}$ at levels found in actual groundwaters.

Figure 1:
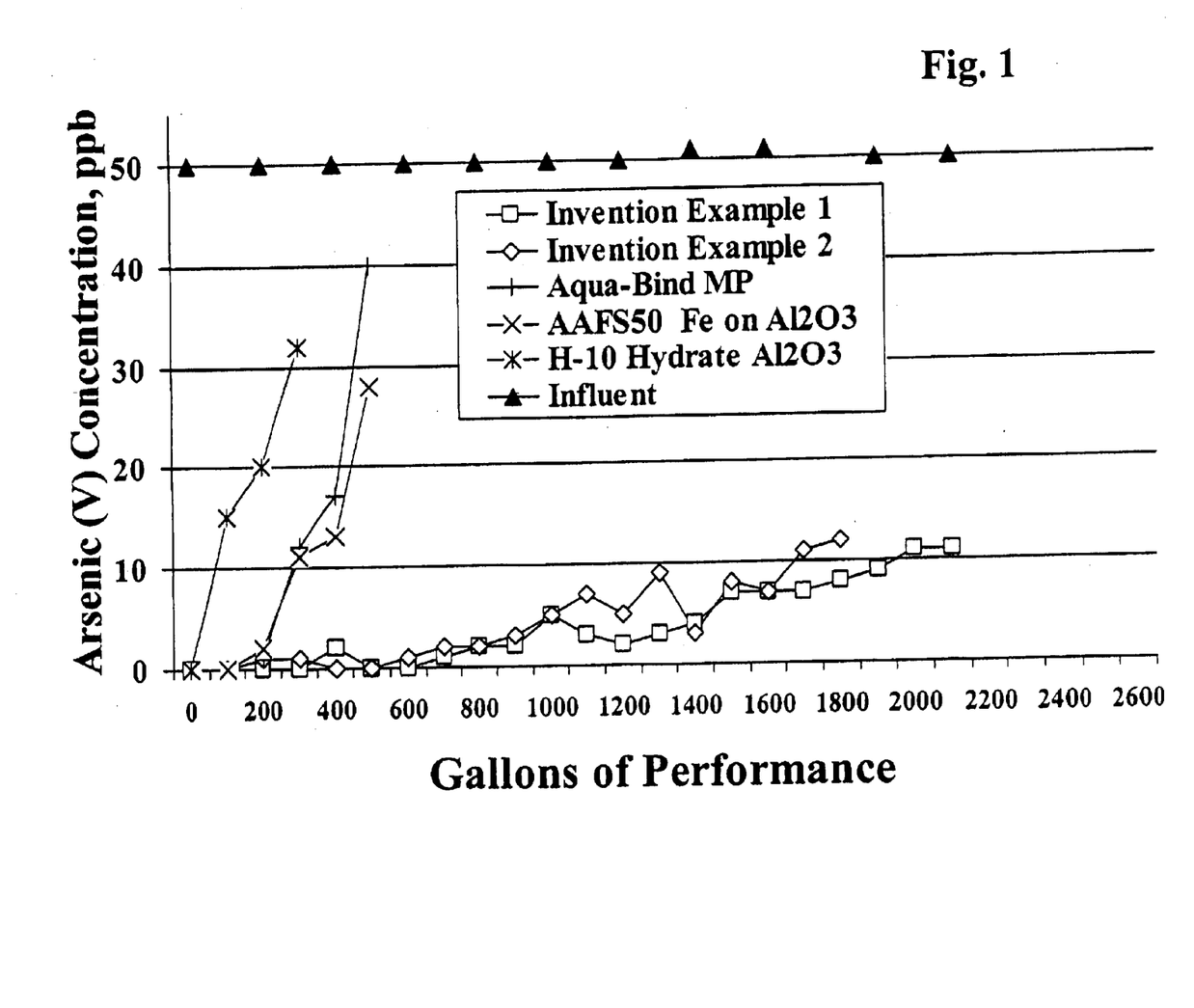
FIGS. 1 to 4 are a graphical illustrations plotting concentration of arsenic versus amount of aqueous system passed through heavy metal removal media.

All of these examples of the present invention showed significantly higher levels of arsenic reduction as compared to Aqua-Bind media, AAFS50 (iron on alumina), and H-10 hydrate (alumina). This data is contained in Table 1 and FIG. 1.

Figure 2:
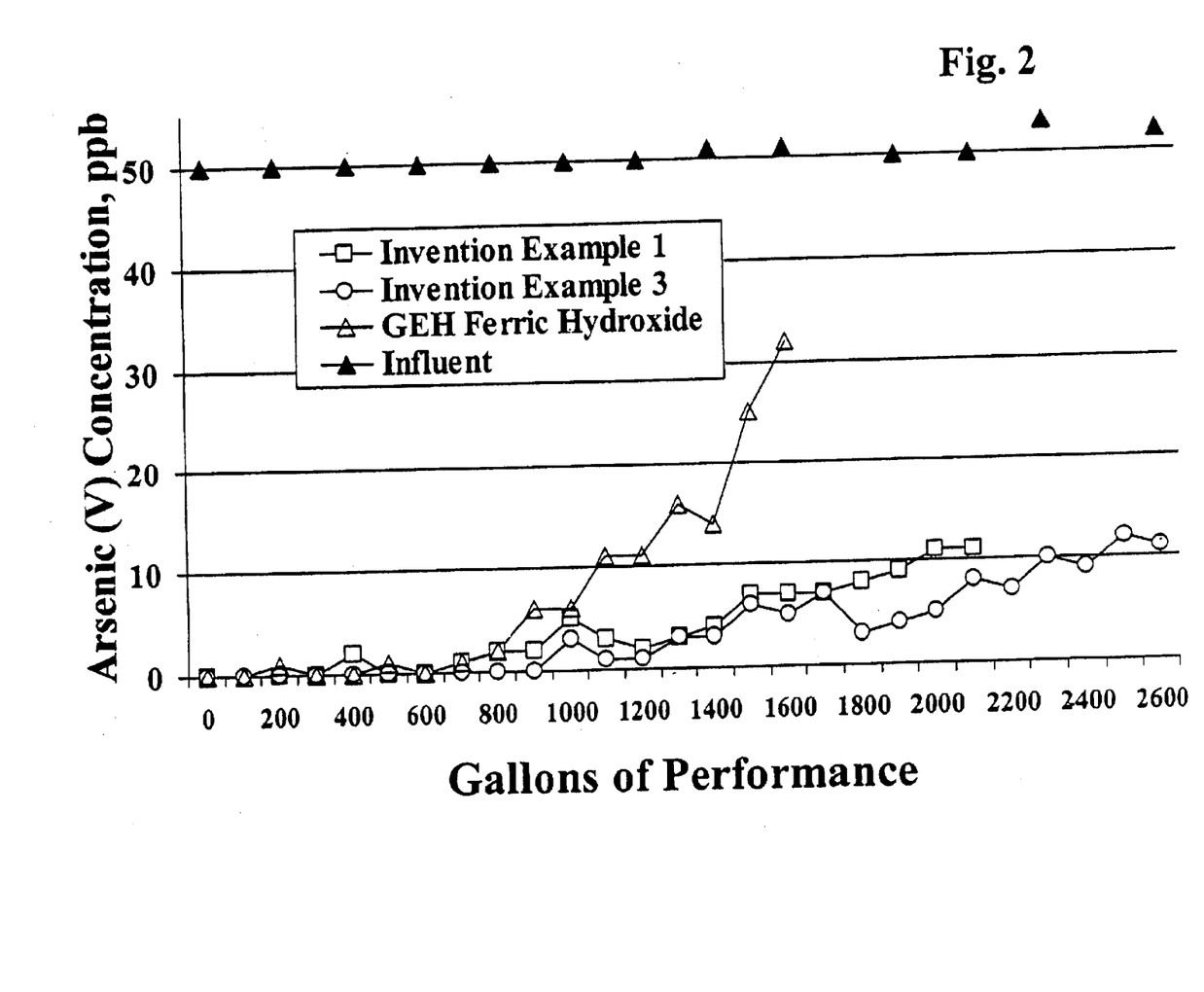

Examples 1 and 3 are prepared without introducing heat during the drying step. These examples of the present invention demonstrated superior arsenic reduction as compared to the GEH granular ferric hydroxide media (conventionally made ferric hydroxide) which is made without drying at all and is supplied & tested in a wet state (i.e. about 50% moisture). The GEH granular ferric hydroxide reduces arsenic to less than 10 ppb levels for 1070 gallons, while Example 1 reduces arsenic to less than 10 ppb levels for 1940 gallons (1.8 times the GEH media performance) and Example 3 reduced arsenic to the stated levels for 2300 gallons (2.1 times the GEH media performance). Example 2 is prepared by using heat during the drying step and still demonstrates higher arsenic removal performance as compared to the GEH media. Example 2 reduces arsenic to the stated levels for 1638 gallons (1.5 times the GEH media performance). This data is contained in Table 1 and FIG. 2.

Ferric hydroxide granules are prepared utilizing the sequential precipitation technique found in the prior art. Samples are prepared with and without introducing heat during the drying step. These samples are tested for arsenic reduction in the same manner as explained above and compared to the examples of the present invention.

Figure 3:
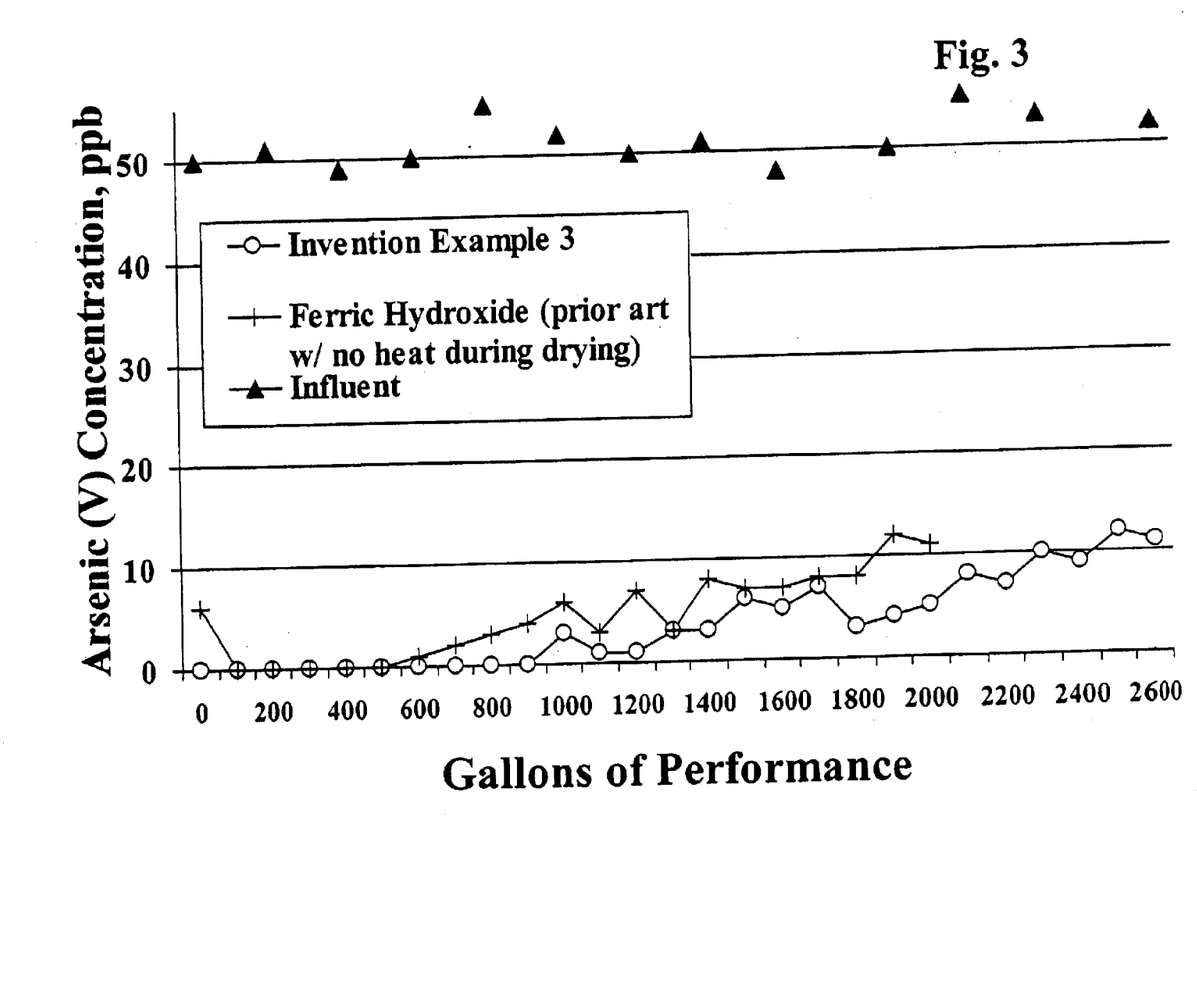

Example 3 and conventional sequential ferric hydroxide (prior art) are both prepared with no heat during drying. The prior art sample prepared with no heat during drying reduces arsenic to less than 10 ppb levels for 1860 gallons, while Example 3 reduces arsenic to the stated levels for 2300 gallons (1.24 times the prior art performance). This data is described in FIG. 3.

Figure 4:
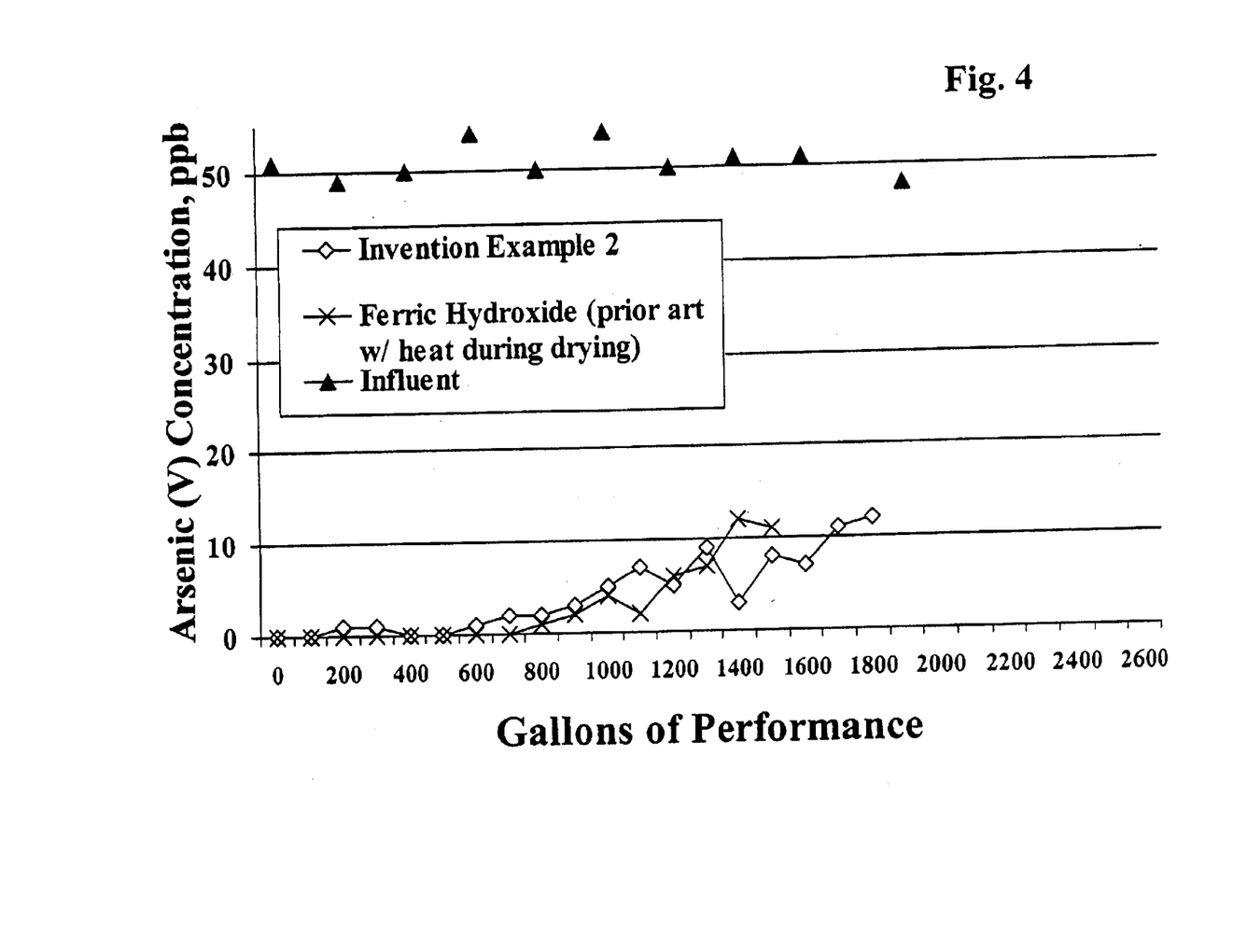

Example 2 and conventional sequential ferric hydroxide (prior art) are both prepared with heat during the drying. The prior art sample prepared with heat during drying reduces arsenic to the stated levels for 1333 gallons, while Example 2 reduces arsenic to the stated levels for 1638 gallons (1.23 times the prior art performance). This data is described in FIG. 4.

TABLE 1

| Media | As removal performance (total gallons) |
|---|---|
| Aqua-Bind | 280 |
| AAFS50 (iron on alumina) | 280 |
| H-10 (activated alumina) | 70 |
| GEH (granular conv. ferric hydroxide) | 1,070 |
| conv. ferric hydroxide w/heating | 1,333 |
| conv. ferric hydroxide w/o heating | 1,860 |
| Example 1 | 1,940 |
| Example 2 | 1,638 |
| Example 3 | 2,300 |

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A heavy metal removal media, comprising:
ferric hydroxide having less than 50% microporosity, from 50% to about 100% mesoporosity and/or macroporosity, and an average particle size by weight from about 5 microns to about 175 microns; and
at least one of a binder and a lubricant.

2. The heavy metal removal media of claim 1, wherein the ferric hydroxide has less than about 40% microporosity, from about 60% to about 99% mesoporosity and/or macroporosity, and an average particle size by weight from about 10 microns to about 160 microns.

3. The heavy metal removal media of claim 1 further comprising at least one selected from the group consisting of sequential ferric hydroxide, activated carbon, alumina, magnesia, bauxite, and zeolites.

4. The heavy metal removal media of claim 1, the media is in granule form, and the average particle size by weight of the granules is from about 4 mesh to about 400 mesh.

5. The heavy metal removal media of claim 1, wherein the binder is selected from the group consisting of alginates, dextrin, glucose, gums, starch, waxes, glues, polyvinyl acetate, polyolefins, polyvinyl alcohol, ammonium phosphate, alkaline silicates, silica hydrosol, alumina, silica-alumina, and colloidal clays.

6. A method of making a heavy metal removal media, comprising:
simultaneously combining in a vessel at least one iron salt and at least one hydroxide compound to form a ferric hydroxide slurry;
recovering the ferric hydroxide from the slurry; and
combining the ferric hydroxide with least one of a binder and a lubricant.

7. The method of claim 6, wherein at least one iron salt is at least one selected from the group consisting of ferric chloride, ferric fluoride, ferric bromide, ferric nitrate, ferric sulfate, ferric phosphate, ferric carbonate, ferric bicarbonate, ferrous chloride, ferrous bromide, ferrous iodide, ferrous acetate, ferrous bicarbonate, ferrous bicarbonate, and ferrous sulfate and at least one hydroxide compound is at least one selected from the group consisting of ammonia hydroxide, alkyl ammonium hydroxide, tetra-alkylammonium hydroxides, sodium hydroxide, potassium hydroxide, calcium hydroxide, and magnesium hydroxide.

8. The method of claim 6, wherein the ferric hydroxide is recovered from the slurry by filtration.

9. The method of claim 6, wherein the iron salt is in a first aqueous solution and the hydroxide compound is in a second aqueous solution, and the iron salt and the hydroxide compound are simultaneously combined by combining the first aqueous solution and the second aqueous solution to form the ferric hydroxide slurry.

10. The method of claim 6, wherein the ferric hydroxide slurry comprises ferric hydroxide solids where 10% by volume of the ferric hydroxide solids have a particle size from about 0.1 to about 1.2 microns, 50% by volume have a particle size from about 1.5 to about 6.5 microns, and 90% by volume have a particle size from about 7.5 to about 20 microns.

11. The method of claim 9, wherein the first aqueous solution comprises from about 3% to about 30% by weight of at least one iron salt hydroxide compound and the second aqueous solution comprises from about 3% to about 30% by weight of at least one hydroxide compound.

12. The method of claim 9, wherein the ferric hydroxide slurry is mixed and maintained at a pH from about 6 to about 9.

13. The method of claim 6 further comprising drying the recovered ferric hydroxide at temperatures from about 30° C. to about 150° C.

14. The method of claim 6, wherein the binder is at least one selected from the group consisting of alginates, dextrin, glucose, gums, starch, waxes, glues, polyvinyl acetate, polyolefins, polyvinyl alcohol, ammonium phosphate, alkaline silicates, silica hydrosol, alumina, silica-alumina, and colloidal clays.

15. The method of claim 6, wherein the heavy metal removal media comprises arsenic removal media.

16. A method of removing heavy metals from aqueous systems, comprising:
contacting an aqueous system comprising a first amount of heavy metals with a media comprising at least one of a binder and a lubricant, and ferric hydroxide made by simultaneously combining in a vessel at least one iron salt and at least one hydroxide compound; and
recovering an aqueous system comprising a second amount of heavy metals, wherein the second amount is less than the first amount.

17. The method of claim 16, wherein the ferric hydroxide has less than 50% microporosity, from 50% to about 100% mesoporosity and/or macroporosity, and an average particle size by weight from about 5 microns to about 175 microns.

18. The method of claim 16, wherein the ferric hydroxide has less than about 40% microporosity, from about 60% to about 99% mesoporosity and/or macroporosity, and an average particle size by weight from about 10 microns to about 160 microns.

19. The method of claim 16, wherein the media is in granule form, and the average particle size by weight of the granules is from about 4 mesh to about 400 mesh.

20. The method of claim 16, wherein the heavy metals comprise at least one selected from the group consisting of lead, cadmium, zinc, copper, chromium, arsenic, and mercury.

21. The method of claim 16, wherein the heavy metals comprise arsenic.

22. The method of claim 16, wherein the binder is at least one selected from the group consisting of alginates, dextrin, glucose, gums, starch, waxes, glues, polyvinyl acetate, polyolefins, polyvinyl alcohol, ammonium phosphate, alkaline silicates, silica hydrosol, alumina, silica-alumina, and colloidal clays.

* * * * *